Patented June 6, 1950

2,510,732

UNITED STATES PATENT OFFICE 2,510,732

METHOD OF MAKING 6-METHYLDIHYDRO-CODEINE

August H. Homeyer and John A. Caughlan, Webster Groves, Mo., assignors to Mallinckrodt Chemical Works, St. Louis, Mo., a corporation of Missouri No Drawing. Application February 21, 1948, Serial No. 10,202

9 Claims. (Cl. 260—285)

This invention relates to methods of producing narcotics of the morphine series and more particularly to 6-methyldihydrocodeine.

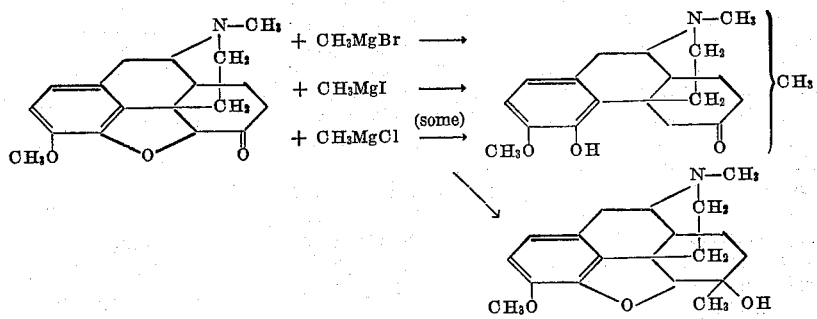

Among the objects of the invention are the provision of methods for preparing 6-methyldihydrocodeine economically; the provision of methods for preparing this compound from readily available materials; and the provision of methods for preparing useful intermediates for the synthesis of narcotic compounds. Other objects will be in part apparent and in part pointed out hereinafter.

The invention accordingly comprises the steps and sequence of steps, and features of manipulation, which will be exemplified in the methods hereinafter described, and the scope of the application of which will be indicated in the following claims.

In a copending application by Whitmore and Homeyer, Serial No. 667,108, filed May 3, 1946, it is shown that dihydrocodeinone can be directly converted to methyldihydrothebainone by reaction with a methyl magnesium halide. In the case of methyl magnesium bromide and methyl magnesium iodide, the reaction proceeds smoothly and gives high yields of methyldihydrothebainone. Thus, the carbonyl group survives and a new methyl group is introduced into the molecule.

It has now been found, on the contrary, that when dihydrocodeinone reacts with methyl magnesium chloride under similar conditions, a very high yield of 6-methyldihydrocodeine, a useful analgesic, is formed and only very small proportions of methyldihydrothebainone are produced. Thus, the carbonyl group is attacked by methyl magnesium chloride and is converted to a carbinol, the methyl group attaching itself to the carbonyl carbon atom. The course of the two reactions may be illustrated as follows:

The following example illustrates the invention.

Example

Most of the ether was distilled from the methyl magnesium chloride prepared from 48.6 g. of magnesium turnings until a thin syrup remained, and then the addition of dry benzene (600 ml.) was begun while the distillation was continued until substantially all of the ether was displaced. A warm solution of 150 g. of dihydrocodeinone in 1700 ml. of dry benzene was added to the stirred Grignard reagent over a period of three minutes. The exothermic reaction which took place caused the benzene to reflux, but refluxing stopped on the addition of the last of the dihydrocodeinone solution. The reaction mixture was refluxed for five hours.

The reaction mixture was hydrolyzed by pouring it onto a mixture of 200 g. of $NH_4Cl$, 300 ml. of chloroform, and 1400 cc. of crushed ice. The solvent layer was removed, and the aqueous layer was extracted with six portions totaling 4000 ml. of 35 vol. % solution of chloroform in benzene. The combined solvent layers were transferred to a Claisen flask and distilled until no more solvent came over under vacuum. The residue was suspended in 310 ml. of hot water and made acid to Congo. The hot solution was treated with decolorizing carbon and filtered.

The acid solution was poured into a mixture of 300 ml. of 35° Bé. sodium hydroxide solution and 300 ml. of water. The white precipitate was collected and washed with several portions of water. The dried product weighed 123.5 g. or 78.4% of the theoretical amount of crude 6-methyldihydrocodeine. Recrystallization from methyl alcohol and water gave a high recovery of pure product melting at 114.5–115.5° C.

The alkaline mother liquor from the 6-methyldihydrocodeine was partially neutralized with hydrochloric acid and then excess ammonium chloride was added. The precipitate which formed was suspended in dilute sodium hydroxide and extracted with benzene to remove impurities. The phenolic products were isolated from the sodium hydroxide layer by adding ammonium chloride and extracting with chloroform. The solvent was distilled off and the methyldihydrothebainone was purified as the hydrobromide salt. The base obtained from the salt melted at 187–191° C. with decomposition and a mixture with known methyldihydrothebainone melted at the same temperature, thus confirming the identity of the product.

Although dihydrocodeinone does not react with Grignards under ordinary conditions it has been found in accordance with the present invention and the invention of Whitmore and Homeyer, Serial No. 667,108, that under special conditions, such as in an aromatic solvent, reaction does occur. In the case of the present invention the reaction of dihydrocodeinone with methyl magnesium chloride gives largely 6-methyldihydrocodeine, a product which it had not previously been thought possible to produce by this method.

In view of the above, it will be seen that the several objects of the invention are achieved and other advantageous results attained.

As many changes could be made in the above methods without departing from the scope of the invention, it is intended that all matter contained in the above description shall be interpreted as illustrative and not in a limiting sense.

We claim:

1. The method of making 6-methyldihydrocodeine which comprises reacting dihydrocodeinone with methyl magnesium chloride in an aromatic solvent.

2. The method of making 6-methyldihydrocodeine which comprises reacting dihydrocodeinone with methyl magnesium chloride in an aromatic solvent under anhydrous conditions.

3. The method of making 6-methyldihydrocodeine which comprises adding dihydrocodeinone to methyl magnesium chloride in benzene.

4. The method of making 6-methyldihydrocodeine which comprises removing the major portion of the solvent ether from an ethereal solution of methyl magnesium chloride, adding an aromatic solvent to said methyl magnesium chloride and then adding dihydrocodeinone.

5. The method of making 6-methyldihydrocodeine which comprises adding a solution of dihydrocodeinone to methyl magnesium chloride in an aromatic solvent.

6. The method of making 6-methyldihydrocodeine which comprises adding a solution in an inert organic solvent of dihydrocodeinone to methyl magnesium chloride in an aromatic solvent.

7. The method of making 6-methyldihydrocodeine which comprises adding a solution in an inert aromatic solvent of dihydrocodeinone to methyl magnesium chloride in an aromatic solvent.

8. The method of making 6-methyldihydrocodeine which comprises adding a benzene solution of dihydrocodeinone to methyl magnesium chloride in benzene.

9. The method of making 6-methyldihydrocodeine which comprises adding a benzene solution of dihydrocodeinone to a benzene solution of methyl magnesium chloride and decomposing the complex formed.

AUGUST H. HOMEYER.
JOHN A. CAUGHLAN.

REFERENCES CITED

The following references are of record in the file of this patent:

UNITED STATES PATENTS

| Number | Name | Date |
|---|---|---|
| 2,178,010 | Small et al. | Oct. 31, 1939 |

OTHER REFERENCES

Small et al.: J. Am. Chem. Soc., vol. 58, pp. 1457–1463 (1936).

Small et al.: J. Org. Chem., vol. 12, pp. 284–292 (Mar. 1947).